J. F. KELLER.
DIE SINKING, ENGRAVING, AND REPRODUCING DEVICE FOR MILLING MACHINES.
APPLICATION FILED JULY 14, 1917.
1,313,543.
Patented Aug. 19, 1919.
2 SHEETS—SHEET 1.
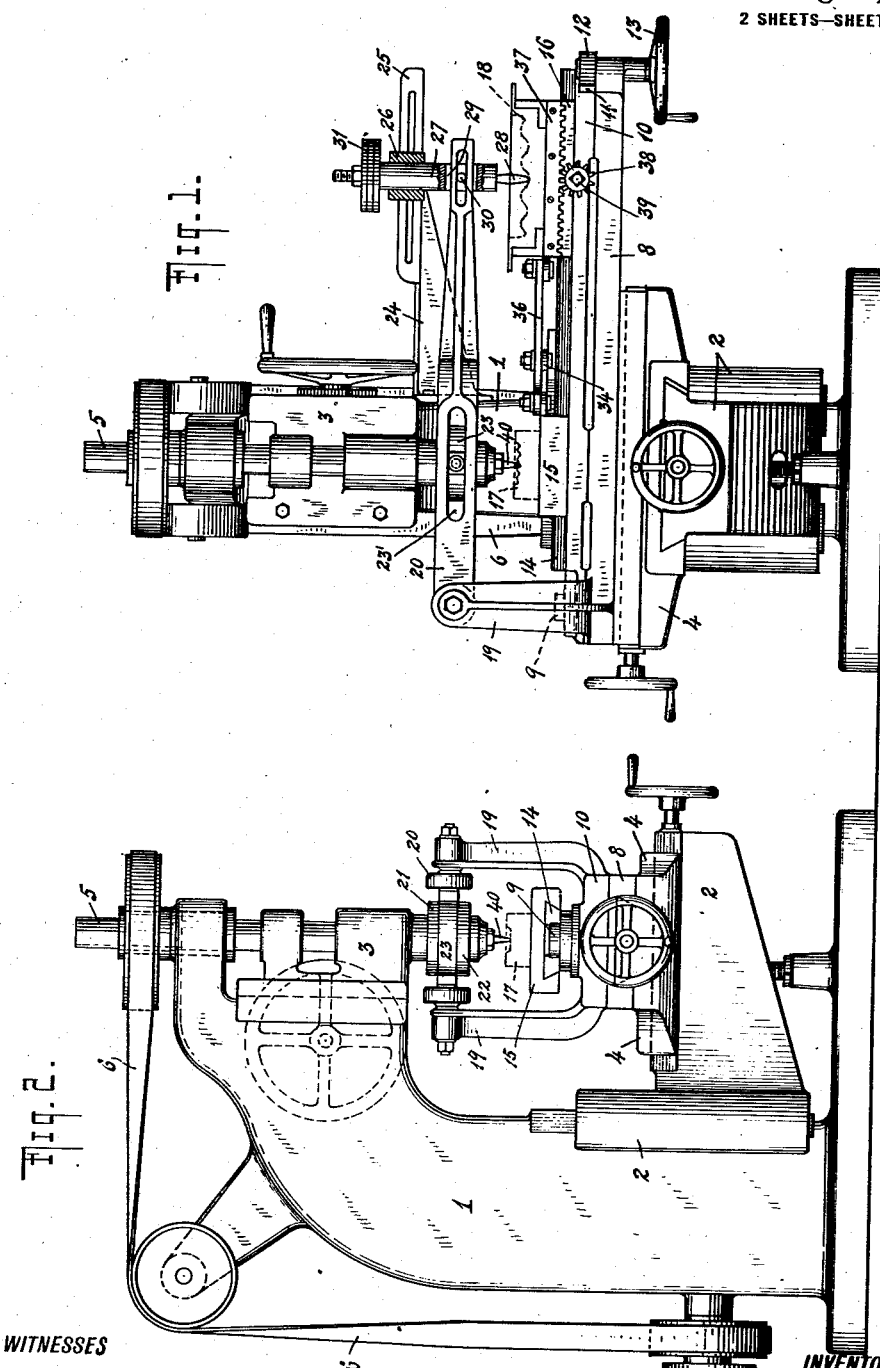
WITNESSES
INVENTOR
JOSEPH F. KELLER
BY
ATTORNEYS

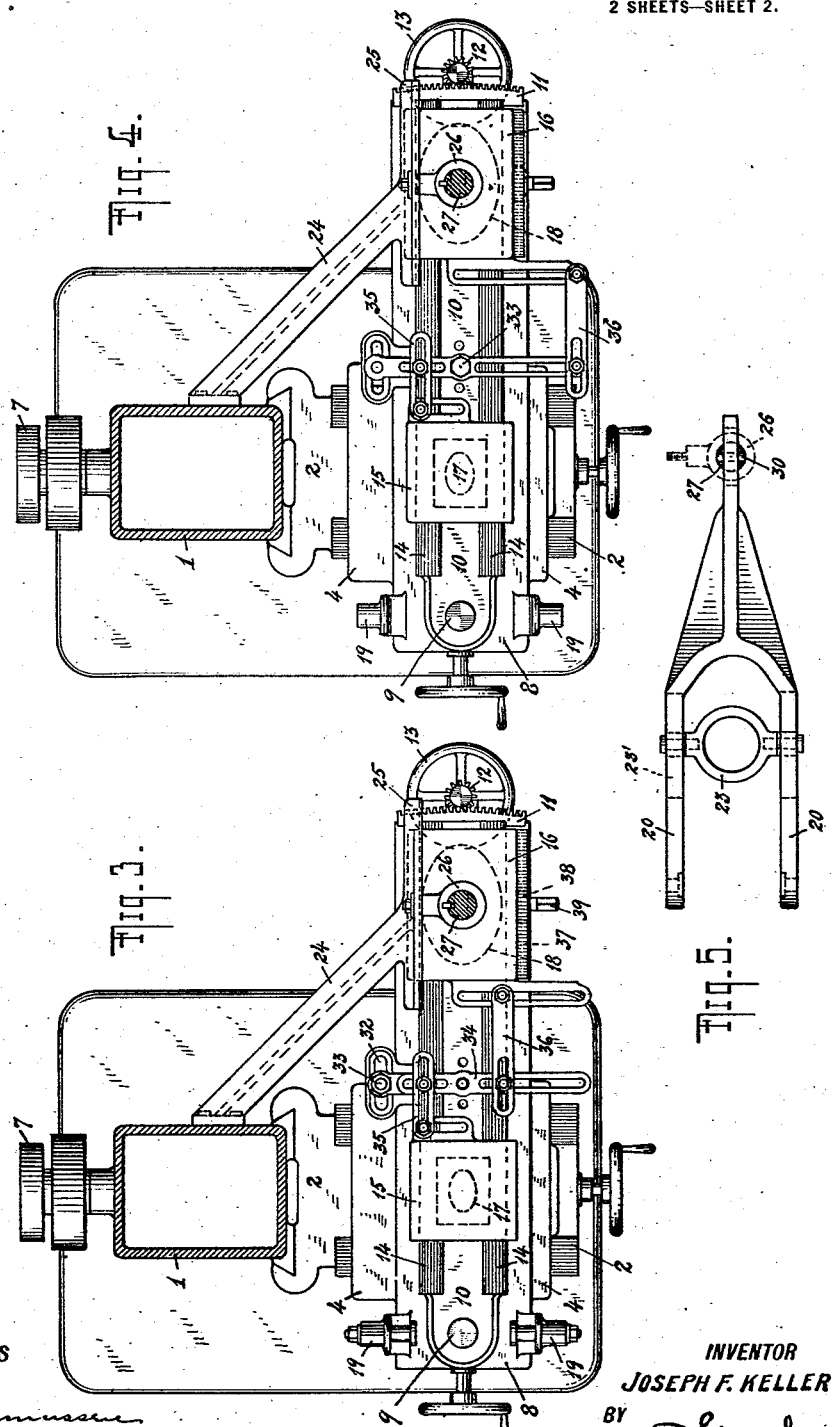

UNITED STATES PATENT OFFICE.

JOSEPH F. KELLER, OF NEW YORK, N. Y., ASSIGNOR TO KELLER MECHANICAL ENGRAVING COMPANY, OF BROOKLYN, NEW YORK, A CORPORATION OF NEW YORK.

DIE SINKING, ENGRAVING, AND REPRODUCING DEVICE FOR MILLING-MACHINES.

1,313,543.   Specification of Letters Patent.   Patented Aug. 19, 1919.

Application filed July 14, 1917. Serial No. 180,496.

*To all whom it may concern:*

Be it known that I, JOSEPH F. KELLER, a citizen of the United States, residing in the city, county, and State of New York, have invented certain new and useful Improvements in Die Sinking, Engraving, and Reproducing Devices for Milling-Machines, of which the following is a specification.

My invention relates to a device for engraving or sinking dies, or for reproducing in relief or in intaglio, and more especially to such a device as is to be employed in reproducing from a templet, model or pattern on either a reduced or an enlarged scale.

My invention relates particularly to a device, as aforesaid, which shall be capable of being quickly and easily attached to or detached from a milling machine of usual type, especially a vertical milling machine, so as to be used in conjunction therewith as convenience may dictate without in any way affecting the use of the milling machine in the performance of its usual functions.

While primarily my improved device is intended to operate as a milling machine attachment, it may, if desired, be so constructed as to embody a permanently assembled unitary mechanism for die sinking, engraving or reproducing as above set forth.

The object of my invention is to provide a simple and relatively inexpensive attachment which may be quickly and easily attached to a milling machine of usual type so as to thus provide an effective machine for die sinking, engraving, reproducing and the like from a templet or pattern, the milling cutter serving as the cutting tool for the die sinking or other work being done.

In my pending application No. 165,871, filed May 2, 1917, I have disclosed an improved form of machine for die sinking, engraving and the like comprising an arm pivoted at one end so as to move in a plane substantially parallel to work and pattern and also in a plane perpendicular thereto, the work and pattern being fixed in line with one another at distances from the pivotal axis of the arm bearing a determined ratio to one another. The cutter and tracer for work and pattern are slidably fixed upon the arm at distances corresponding with work and pattern respectively; cutter and tracer are, also, so linked together that they can be slid simultaneously upon the arm by amounts proportioned to one another as are the distances of work and pattern respectively from the pivotal axis of the arm. The arrangement is such, therefore, that the necessary three dimensional motions required in reproduction, as between the cutter and tracer on the one hand and the work and pattern on the other hand, are entirely due to or associated with the operating arm, the work and pattern remaining fixed, as originally set up, throughout the operation of the machine.

The arrangement of my present invention is similar to that of my application aforesaid in that here, as there, a single arm is employed. In the present case, however, it is the work and pattern which are slidably disposed upon the arm while the cutter and tracer are fixed upon the frame of the machine adjacent to the arm. The arm pivots in a plane at right angles to cutter and tracer, thus providing for one dimension, work and pattern simultaneously slide linearly upon the arm thus providing for a second dimension, and cutter and tracer are arranged to move or slide axially thus providing for the third dimension.

My invention will be better understood by referring to the accompanying drawings in which Figure 1 represents a front elevation of a vertical milling machine of usual type having my invention embodied therein; Fig. 2 is an end elevation, taken from the left, of Fig. 1; Fig. 3 is a plan view, part section, of the machine of Figs. 1 and 2, certain parts being omitted so as to show the work and pattern holding bed or carrier arm of my invention; Fig. 4 is a view, similar to Fig. 3, showing my invention as arranged for making a reversed (from right to left) instead of a direct, reproduction; and Fig. 5 is a plan view, part section, of the control arm which insures that the axial movement of cutter and tracer shall be properly proportional to one another.

Referring to the drawings, a base supports the standard 1 provided with the usual knee 2 and spindle head or bearing 3, both of which are vertically adjustable; the knee, in turn, carries the usual transversely adjustable saddle 4.

The spindle 5 is driven from a belt 6 which itself takes power from a main drive pulley 7.

Having dovetailed attachment with the saddle 4 is a longitudinally adjustable table 8 to one end of which (the left, in the present instance) is pivoted at 9 an overlying work and pattern holding bed or carrier arm 10. A curved rack 11 at the other end of the carrier arm is in mesh with a gear 12 journaled in the adjacent end of table 8 and controlled by a hand wheel 13 so that the carrier arm may be swung in a horizontal plane about the pivot 9.

Carrier arm 10 is provided with dovetailed tracks 14 to which are fitted a linearly adjustable work clamp 15 and a linearly adjustable pattern clamp 16, the former of which carries the work 17 and the latter of which carries the pattern 18.

Erected on the two sides of the table 8, in the transverse plane of the pivot 9, is a pair of standards 19 whose upper extremities are arranged to provide an axis, also in the transverse plane of pivot 9, for the forked ends of a control arm 20.

Spindle head 3 is provided with a fixed collar 21 and a removable collar 22 preferably screw-threaded (not shown) thereon and between these collars is clamped a spindle control ring 23 which is pivotally supported between slots 23' of the forked ends of control arm 20 so as to be longitudinally adjustable therein.

Bolted to the right hand side of standard 1 is a webbed bracket 24 bearing, at its outer end, a slotted plate 25, to which is bolted a tracer point bearing 26 which is bored so as to receive a vertically slidable tracer chuck 27. Plate 25 is so positioned that the axis of the tracer point bearing will lie in the longitudinal vertical plane common to spindle 5 and pivot 9.

The bottom end of chuck 27 is formed to receive and hold the tracer point 28. There is also provided, in said chuck 27, a central longitudinal slot 29 just wide enough to receive without play the flattened and slotted outer end of control arm 20. A pin 30 passes transversely across slot 29 and through the slot of the control arm and, being of diameter such as to just pass through the control arm slot, prevents any up and down play between the control arm and the chuck 27.

An adjustable weight 31, comprising one or more flat disks, puts a downward pressure upon the chuck 27 and the tracer point 28 of any desired amount.

Fixed to the rear side of carrier arm 10 is a bracket 32 having a slot in which is mounted (Fig. 3) a longitudinally adjustable bearing 33 upon which pivots a work and pattern connecting lever 34. This lever 34 is provided with two linearly disposed slots between one of which and a slotted plate fixed to the work clamp 15 is a connecting link 35, pivotally attached at both ends, while between the other and a slotted plate fixed to the pattern clamp 16 is connected a similarly pivoted lever 36.

A rack 37 is fixed to the front of the pattern clamp 16 and meshes with a gear 38, journaled upon carrier arm 10, having a spindle 39 adapted to take a hand wheel or operating crank (not shown). The spindle 5 carries the usual chuck in which is held the cutter 40.

As illustrated, the parts are so proportioned as to contemplate work which is a direct facsimile of the pattern, either in relief or intaglio, but reduced in the proportion of 1 to 3.

The operation of my invention is as follows: The table 8 should be adjusted longitudinally until the pivot 9 is so located that the distance between its axis and the axis of the cutter is to the distance beween its axis and the axis of the tracer point 28 in the proportion of 1 to 3. The tracer point bearing 26 may be adjusted in the slotted plate 25 to aid in bringing this result about.

The work 17 and pattern 18 should then be clamped in the work and pattern clamps 15 and 16, and said clamps longitudinally adjusted if necessary so as to bring the center of the work and the center of the pattern (or corresponding parts of work and pattern) respectively under the cutter point and the tracer point. In making this adjustment the slotted links 35 and 36 may be shortened and lengthened.

The links 35 and 36 must also be adjusted, keeping them always parallel to the longitudinal axis of carrier arm 10 and the lever 34 always perpendicular to such axis, with respect to the axis of bearing 33 so that the distance between said bearing axis and the center line of link 35 is to the distance between the bearing axis and the center line of link 36 as 1 to 3.

The machine now being started up by applying power to the pulley 7, the cutter will sink down into the work 17 until the tracer point 28 rests upon the pattern 18 when the control arm 20 will prevent any further sinking of the cutter. If now the hand wheel 13 be operated, the gear 12 acting upon rack 11 will swing the carrier arm 10 horizontally about pivot 9 and the cutter will cut a curved path upon the face of the work corresponding to a similar path upon the pattern just three times as long. And the rise and fall of the cutter will, similarly, be just one-third that of the tracer point.

After the cutter has thus been caused to cut one curved trace upon the work, the rack 37, through gear 38 and spindle 39, is caused to move the pattern clamp 16 slightly to the right or left as the case may be. This, through link 36, lever 34, and link 35, will correspondingly move the work clamp 15 but only one-third as far. The carrier arm 10 may now be swung back under the cutter about the pivot 9, thus cutting another curved path upon the work adjacent to the first one. And these operations may be repeated until the entire surface of the work has been gone over in correspondence with the pattern.

Other ratios of reduction for the work, not differing too much from that of 1 to 3, may be employed by suitably moving the table 8 to the left or right, as the case may be, so as to correspondingly shift the location of pivot 9 with respect to cutter 40 and by making any necessary corresponding changes in the position of lever 34, bearing 26, and position and length of links 35 and 36.

It is sometimes desired to have the work reversed from right to left, as to the pattern. This may readily be accomplished by placing the point of pivotal attachment of the lever 34 to carrier arm 10 between the links 35 and 36 instead of at one end of the lever at the same side of both links. This changed arrangement is shown in Fig. 4. Here the bearing 33 is fixed in the body of the carrier arm 10 and the links 35 and 36 lie on each side of the bearing at distances proportional to one another as 1 to 3. Any longitudinal movement of the pattern will, therefore, result in a movement of the work through one-third the distance in the opposite direction. The work will, hence, be a reversed reproduction of the pattern to a scale of 1 to 3.

The table 8 may be quickly removed when desired carrying with it all the special parts necessitated by my invention except the bracket 24 and parts supported thereby; the milling machine may then be used to execute its usual functions. Bracket 24 and its attached parts will not ordinarily interfere with this usual functioning of the milling machine and may be left in place; but it is easily removed if desired by releasing the bolts which attach it to standard 1.

It is obvious that, by suitably changing the proportions of the parts, the scale of reproduction possible with my invention may be made anything desired.

It is also obvious that, if desired, the arrangement may be built to provide for reproducing on an enlarged scale as well as on a reduced scale. This would merely require that the standards 19 be shifted from the position shown in the drawings to a position at the other end of table 8 and that the control arm 20 be suitably modified so as to engage the cutter spindle at its outer end and the tracer point bearing at a point intermediate its ends. Other parts, also, would require suitable changes but the exact character of all such changes would readily suggest themselves to those skilled in the art.

Having described my invention, I claim:

1. In combination, a carrier arm pivoted to move in its own plane, a work clamp and a pattern clamp lineally slidable upon said arm, means connecting said clamps whereby they can be slid simultaneously, the movement of each being proportional to its distance from the pivot, and a cutter and a tracer adjacent to work and pattern clamps respectively and at distances from the pivot respectively proportioned to the distances from said pivot of said clamps both cutter and tracer being axially movable and lying in the plane of the pivot axis.

2. In combination, a carrier arm pivoted to move in its own plane, a work clamp and a pattern clamp lineally slidable upon said arm, means connecting said clamps whereby they can be slid simultaneously, the movement of each being proportional to its distance from the pivot, a cutter and a tracer adjacent to work and pattern clamps respectively at distances from the pivot respectively proportional to the distances from said pivot of said clamps both cutter and tracer being axially movable and lying in a plane which includes the pivot axis, and a control arm pivoted upon an axis intersecting the pivotal axis and perpendicular to the plane including cutter and tracer, said control arm being connected to both cutter and tracer so that their axial movement is proportional to their distance from the pivotal axis of said arm.

3. An attachment for milling machines for die sinking and the like comprising a carrier arm adapted to be pivotally attached to the frame of the machine so as to swing under the cutter in a plane at right angles to the axis thereof, a work clamp and a pattern clamp lineally slidable upon said arm, means connecting said clamps whereby they move simultaneously by amounts proportional to their distances from the pivot, a cutter and an axially slidable tracer supported by the milling machine adjacent to work and pattern clamps respectively in a plane which includes that of the pivot and at distances from the pivot respectively proportional to the distances from said pivot of said clamps, and means connecting cutter and tracer whereby as the tracer moves axially in correspondence with the surface of the pattern the cutter will be automatically similarly moved by an amount proportioned to the tracer movement as is the distance of cutter from pivot related to the distance of tracer from pivot.

4. In combination, a milling machine having an axially movable cutter, an axially movable tracer and a pivot parallel to one another in a common plane, a carrier arm mounted to swing upon said pivot adjacent to cutter and tracer, a work clamp and a pattern clamp in line with said pivot at distances therefrom respectively proportional to the distances of cutter and tracer from said pivot, means connecting said clamps for moving them simultaneously toward or away from the pivot by amounts proportional to their respective distances from the pivot, and a control arm connecting cutter and tracer and pivotally attached to the milling machine, the pivotal axis intersecting said first named pivot axis and being perpendicular to the beforementioned common plane.

5. In combination, a carrier arm pivoted to move in its own plane, a work clamp and a pattern clamp radially movable upon said arm with respect to the pivot, means connecting said clamps whereby they can be moved simultaneously by amounts respectively proportional to their distances from the pivot, and a cutter and a tracer adjacent to work and pattern clamps respectively and at distances from the pivot respectively proportional to the distances from said pivot of said clamps, both cutter and tracer being axially movable and parallel to the pivot axis.

In testimony whereof I have hereunto set my hand.

JOSEPH F. KELLER.